Dec. 17, 1968   P. F. McCAUL ET AL   3,417,316
SIDEREAL FREQUENCY GENERATOR
Filed Sept. 28, 1965   2 Sheets-Sheet 1

INVENTORS
Paul F. McCaul &
Raymond Granata
BY
ATTORNEYS

INVENTORS
Paul F. McCaul &
Raymond Granata

BY

ATTORNEYS

United States Patent Office 3,417,316
Patented Dec. 17, 1968

3,417,316
SIDEREAL FREQUENCY GENERATOR
Paul F. McCaul, Mount Rainier, and Raymond L. Granata, Hyattsville, Md., assignors to the United States of America as represented by the administrator of the National Aeronautics and Space Administration
Filed Sept. 28, 1965, Ser. No. 491,054
2 Claims. (Cl. 321—60)

ABSTRACT OF THE DISCLOSURE

Apparatus for the generation of sidereal frequency signals from signals of standard solar frequency utilizing only multiplying and dividing means arranged in a serial manner.

---

Figure 1:
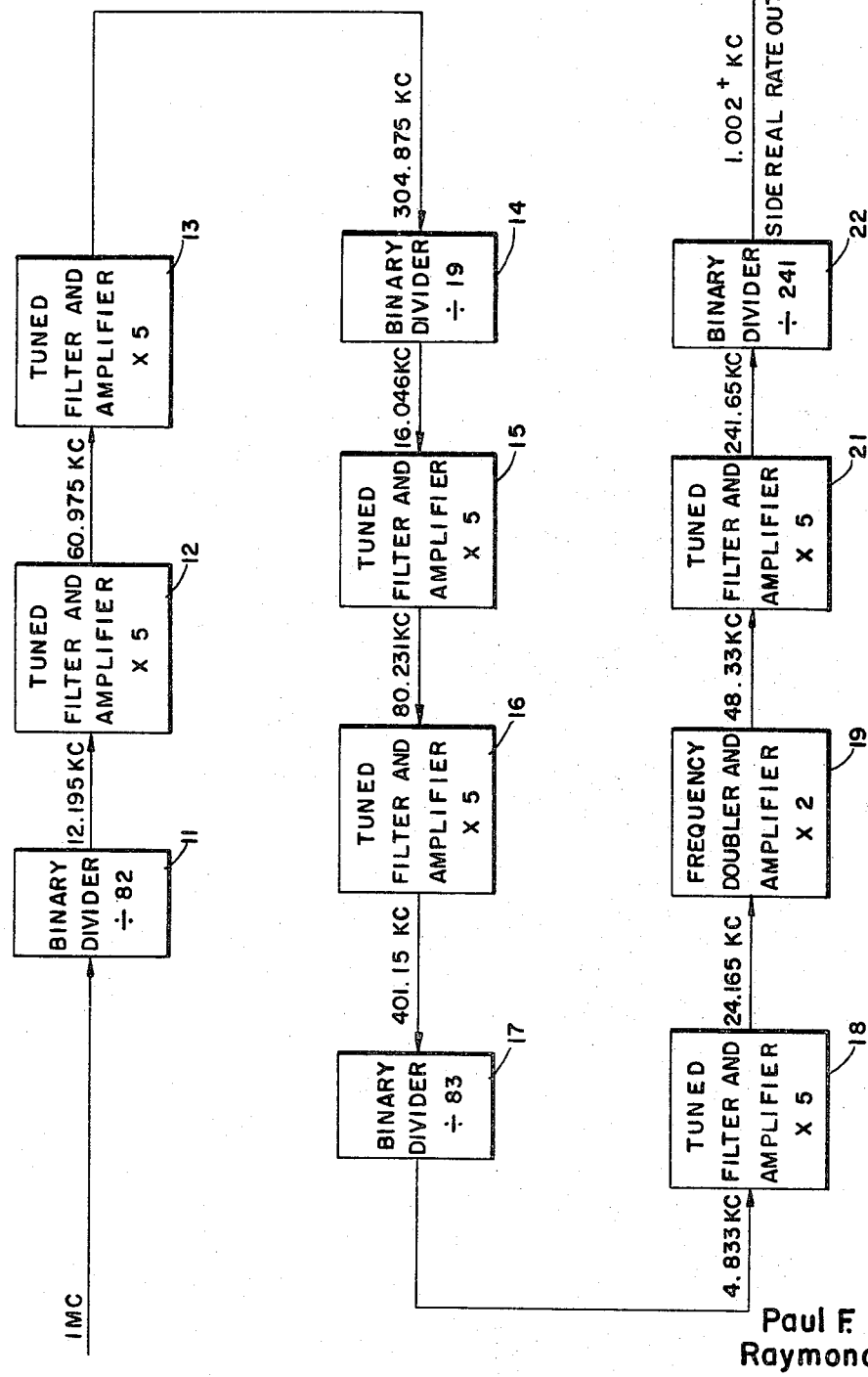

The invention described herein may be manufactured by or for the Government of the United States of America for governmental purposes without the payment of any royalties thereon or therefor.

This invention relates generally to frequency converters, and more particularly to a system that generates a signal of sidereal frequency from a signal of standard solar frequency.

For many purposes, it is desirable to have a time scale that utilizes as its basic reference the relative position of the stars with respect to the rotation of the earth. A signal frequency based on this time scale, better known as the sidereal time scale, it utilized to drive telescope systems and for checking out optical tracking systems. Many astronomical studies require a clock to record sidereal time; this being done by driving the clock with a signal of sidereal frequency.

Sidereal time is defined in terms of a sidereal day, which is the interval between two successive transits of the first point of the star, Aries, over the upper meridian of any point on the earth's surface. A sidereal day contains 24 sidereal hours, each having 60 sidereal minutes of 60 sidereal seconds. In mean solar time, the sidereal day is 23 hours, 56 minutes, and 4.09 seconds. The time difference in the two days is due to the fact that, during the course of the day, the earth's orbital motion about the sun causes the sun to appear to move a little east among the stars. Even if the earth did not rotate on its own axis, the sun would appear to move eastward completely around the earth during one period of the earth's orbit, i.e., one more complete rotation or solar day is included in a solar year as compared to a sidereal year. In other words, sidereal time has as a reference the time it takes for the earth to complete a full rotational cycle with respect to an object an infinite distance away, such as a star, while solar time has as a reference not only the time necessary to complete a rotational cycle but also a time factor due to the orbital motion of the earth about the sun. It will be noted that the difference between a sidereal day and a solar day is about one part in 365 which means that a sidereal year will contain one more solar day than that contained in a solar year.

It is seen, therefore, that a clock keeping time in sidereal units must in the course of a tropical year indicate the passage of one day more than it would indicate in mean solar units. The ratio of sidereal units to the units of mean solar time is 366.2422 to 365.2422, so it follows that a clock designed to indicate mean solar time when driven at a 1-kc. rate will indicate sidereal time when driven at a 1.00273792-kc. rate.

It is desirable to derive this sidereal frequency from a highly accurate and readily available standard solar frequency signal, such as a 1 mc. signal. The problem is how to most efficiently convert from a standard solar frequency signal to a sidereal frequency signal with accuracy up to nine places. It has been the general practice in this field to produce sidereal frequency signals by methods which employ complicated and potentially unreliable signal mixing operations. The use of feedback loops also presents certain problems, for example, if a malfunction should occur the feedback loops would continue to operate while generating signals of incorrect frequencies. Furthermore, check-out and repair of the feedback system is extremely complicated due to the interdependence of the individual signals generated by each individual feedback system. In addition, frequency drift has long been a problem in the mixer circuitry needed in the prior art frequency converters.

The present invention overcomes these aforementioned disadvantages by producing a signal of sidereal frequency from a signal of standard solar frquency without the use of mixing operations or feedback loops. This is accomplished by utilizing only multiplication and division operations and then only in a seriatim, or serial, manner.

The foregoing advantages are attained by first recognizing what the needed conversion factor is between a standard solar frequency of 1 mc. and a sidereal frequency of 1.00273792 kc. The ratio of solar units to sidereal units is .997269580 and if this number, multiplied by 1000, is divided into 1 mc. the desired 1.00273792 kc. frequency will result. The conversion factor 997.2695680 was broken down into its factors of $41 \times 83 \times 19 \times 240 \times .2^6$, or $41 \times 83 \times 19 \times 241/5^6$ for ease of division. The particular sequence of multiplication and division operations is then chosen so that readily available components can be used in the circuit arrangement.

An object of the present invention is to produce a signal of sidereal frequency from a signal of standard solar frequency employing only division and multiplication operations arranged in a seriatim manner.

Another object is to provide a signal of sidereal frequency from a signal of standard solar frequency which will possess the feature of fail-safe operation, so that a malfunction or failure at any point along the seriatim chain will cause the output to fail.

A further object is to reduce the difficulty of checkout and repair of the hardware involved in producing the desired sidereal frequency.

Figure 2:
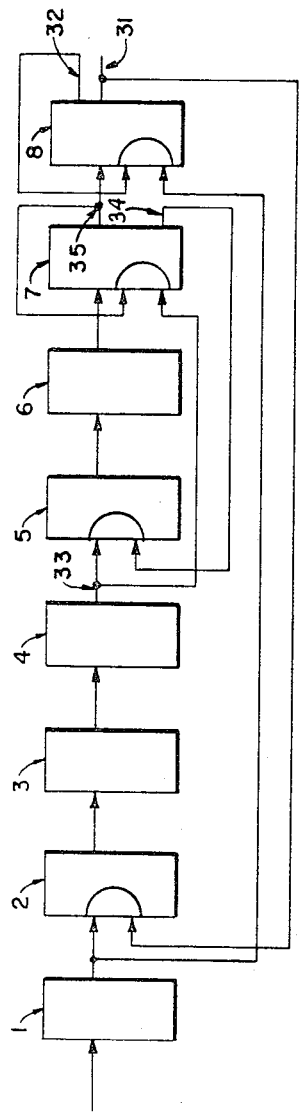
Figure 3:
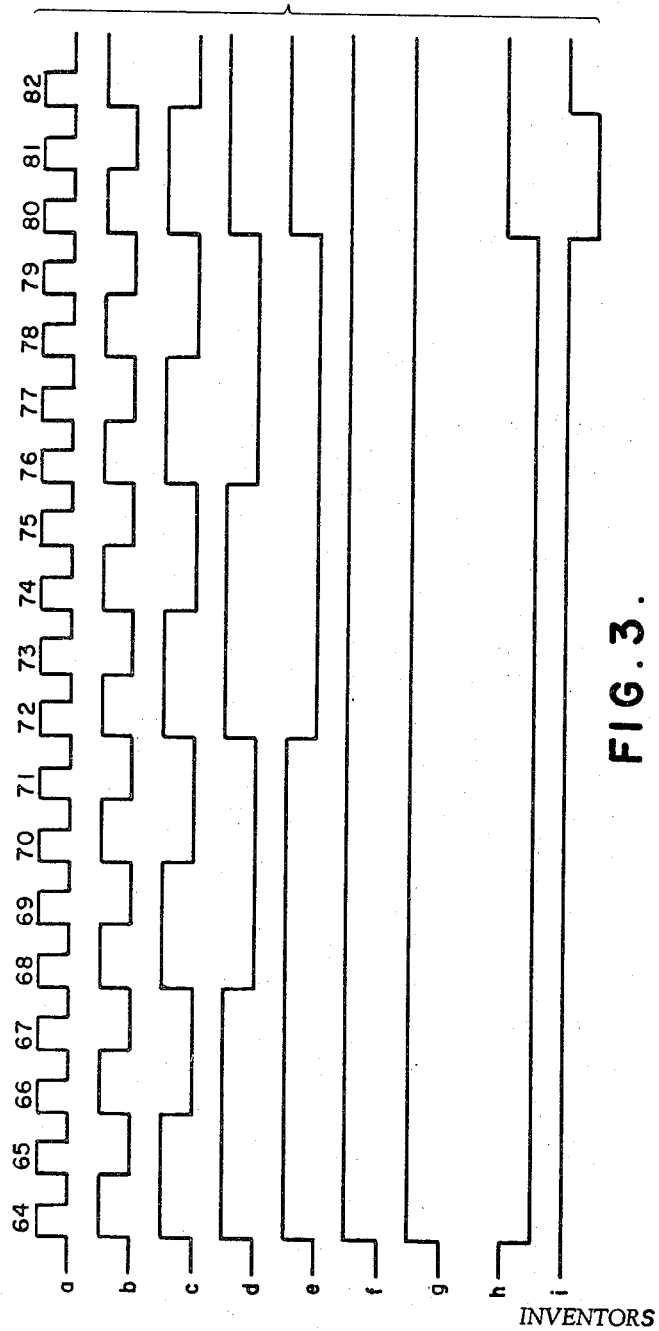

Other objects and attendant advantages of the present invention will be more readily apparent as the same becomes better understood by reference to the following detailed description when considered in conjunction with the accompanying drawing wherein:

FIGURE 1 is a functional block diagram of the division and multiplication chain of the instant invention; and FIGURE 2 is a block diagram of a binary divider connected in a divide-by-82 configuration; and FIGURE 3 is a series of waveforms helpful in understanding the operation of the binary divider of FIGURE 2.

The actual ratio of mean solar units to sidereal units is 0.997269566, but the number 0.9972695680 was chosen because of its ability to be factored in a suitable fashion; this ratio resulting in a sidereal rate accurate to two digits in the eighth place. Now if the standard solar frequency of 1 mc. is divided by 997.2695680 (100× the above-mentioned ratio), or multiplied by $$\frac{1}{997.2695680}$$

the desired 1.00273792 kc. rate will be produced. The number $$\frac{1}{997.2695680}$$

can be broken down into its prime factors $$\frac{5^6}{41 \times 83 \times 19 \times 241}$$

for ease of division.

In FIGURE 1, there is shown a functional block diagram of the divider chain wherein the series of division and multiplication operations, in conformity with the factored ratio set forth above, are performed in a sequential manner. The particular sequence of division and multiplication operations was carefully chosen so that the frequency present at the input of each element is such that readily available components could be used in the circuit elements. Also with regard to the sequence employed in the instant invention, it was found that it would be most efficient to divide the signal by 41 initially. However, due to the propagation delay of the carry pulse through the binary divider circuit, it was impossible to divide the high frequency 1 mc. signal by 41. This problem was solved by employing an additional divide-by-2 circuit in the initial binary divider, thereby effectively reducing the input frequency to 500 kc. This operation, of course, transformed the initial binary divider into a divide-by-82 element, so that it became necessary to add an additional frequency doubler and tuned amplifier 19 to compensate for the additional division by two.

The operation of the system will now be described by proceeding from the input standard solar frequency signal to the output sidereal frequency signal. The 1 mc. standard solar frequency signal, which could be provided by a number of signal sources such as a crystal oscillator, cesium beam resonator, or hydrogen maser, is first applied to a Schmitt trigger circuit (not shown) to convert the signal to a rectangular wave compatible with the binaries used in the divider chain. This rectangular signal is then fed to the divide-by-82 circuit 11, the operation of which will be explained more fully hereinafter, which produces a 12.195 kc. output signal.

The 12.195 kc. signal is then applied to tuned filter and amplifier 12, which is tuned to resonate at the fifth harmonic of the input frequency, so that in effect the output frequency is multiplied by five. This 60.975 kc. signal is then amplified to produce a more stable output and to reduce the signal ripple. The tuned filter portion of element 12 is composed basically of a conventional tank circuit while the tuned amplifier contains a tuned tank circuit located at the collector of the amplifying transistor. A tuned filter and amplifier, such as described in Chapter 16 of Electronic Designer Handbook by Landee, Davis and Albrecht, McGraw-Hill, 1957, could be employed in the present invention.

The output signal from element 12 is sequentially multiplied and divided by the appropriate prime factors so as to produce the desired 1.002737908 kc. standard solar frequency, or 1 kc. sidereal frequency. Binary dividers 14, 17 and 22 operate in a similar manner as divider 11, while the tuned filter and amplifier elements 13, 15, 16, 18 and 21 are identical to element 12 except that they are, naturally, tuned to different frequencies. Frequency doubler and amplifier 19, which is present to compensate for the additional division in divider 11, is tuned to resonate at the second rather than the fifth harmonic.

Referring now to FIGURE 2, there is shown a block diagram of the divide-by-82 element 11 of FIGURE 1 with the eight binaries connected in a particular configuration. In FIGURE 3, waveform (a) is the input signal while waveforms (b) through (i) are the DC potentials at the output from each binary 1 to 8, respectively.

Reading from left to right, each up-going line is a positive going pulse (for example −6 v. to ground) which causes a binary to change its state while each down-going line (from ground to −6 v.) has no effect on the binary. In the following discussion it is assumed that initially all binaries are in the "Zero" state, i.e., the true outputs from each binary are at ground potential (zero volts).

Binary stages 2 and 5 have a gated complement input which means that when either of the inputs are at "one" (−6 v.) the gate is enabled and a positive transition at the other input will cause the binary to change its state. However, when any of the inputs are at "zero" (ground potential) the gate is inhibited and a positive transition at the other input has no effect on the binary. Binary stages 7 and 8 have gated AC reset inputs so that a positive transition applied to either input when the binary is in the set (zero) state resets the binary to the "one" state.

The binaries are connected in the following manner: The output from binary 1 is utilized as one of the gate inputs to both binary 2 and 8. The other gate input to binary 2 is the output 31 of binary 8, while the output 32 of binary 8 is fed back as the other gate input to the same binary. The output 33 of binary 4 is utilized as one of the gate inputs to both binary 5 and 7. The other gate input to binary 5 is the output 34 from binary 7 and the output 35 from binary 7 is fed back to the same binary as the other gate input.

The first 64 pulses cause the circuit to operate as a straight binary counter. The 64th pulse, however, causes binary 7 to change its state, so that output 34 which was at "one" (−6 v.) now becomes a "zero" (0v) inhibiting the input to binary 5. The output 35 of binary 7, which was at "zero," now becomes a "one" enabling the gated input to binary 7.

The 72nd input pulse will cause binary 4 to change its state again, but the output 33 of binary 4, which is a negative transition, will have no effect on the other binaries. The 80th input pulse will cause binary 4 to change its state again. Output 33 of binary 4, which is a positive transition, will have no effect on binary 5 because the input gate is inhibited, however, this positive transition will cause the seventh binary to change its state. Furthermore, the positive transition occurring at output 35 of binary 7 will cause binary 8 to change its state.

The 81st input pulse will cause the first binary to change its state again, but since it is a negative transition it will have no effect on the other binaries. The 82nd input pulse, on the other hand, will cause a positive transition at the output of binary 1, which in turn will cause the eighth binary to change its state again. Therefore, one output pulse will be obtained for every 82 input pulses. The other dividers operate in a similar manner but, of course, produce an output signal after a different number of input pulses have been received.

It is evident that the instant invention provides a novel system for producing a sidereal frequency signal from a standard solar frequency signal without the need for mixing circuits or feedback loops. Obviously, the particular sidereal frequency signal produced is only by way of example, and other output frequency signals can be attained with only slight modifications. Similarly, variations in the design of the frequency multipliers and dividers could be accomplished within the scope of the invention.

Obviously, numerous modifications and variations are possible in the light of the above teachings. It is therefore understood that within the scope of the appended claims, the invention may be practiced otherwise than described herein.

What is claimed is:

1. A system for developing a signal of sidereal frequency from a signal of standard solar frequency comprising: first dividing means having applied thereto a signal of standard solar frequency for dividing the frequency of said signal by 82, first multiplying means connected to said first dividing means for multiplying the frequency of the signal therefrom by 5, second multiplying means connected to said first multiplying means for multiplying the frequency of the signal therefrom by 5, second dividing means connected to said second multiplying means for dividing the frequency of the signal therefrom by 19, third multiplying means connected to said second dividing means for multiplying the frequency of the signal therefrom by 5, fourth multiplying means connected to said third multiplying means for multiplying the frequency of the signal therefrom by 5, third dividing means connected to said fourth multiplying means for dividing the frequency of the signal therefrom by 83, fifth multiplying means connected to said third dividing means for multiplying the frequency of the signal therefrom by 5, sixth multiplying means connected to said fifth multiplying means for multiplying the frequency of the signal therefrom by 2, seventh multiplying means connected to said sixth multiplying means for multiplying the frequency of the signal therefrom by 3, fourth dividing means connected to said seventh multiplying means for dividing the frequency of the signal therefrom by 241.

2. The system as described in claim 1 wherein the said signal of standard solar frequency is 1 mc.

References Cited

UNITED STATES PATENTS

| | | | |
|---|---|---|---|
| 2,719,917 | 10/1955 | Chapman | 331—50 X |
| 2,945,997 | 7/1960 | Kennedy | 318—171 X |

OTHER REFERENCES

"Frequency Division by Cascaded Binaries" by I. Gottlieb., Tele-Tech & Electronic Industries March 1956, pp. 92, 93, 142, 144, 146 relied upon. Copy in 321–66.

"A Novel Method for Frequency Multiplication" by H. T. McAleer, Electronic Industries August 1959; pp. 96–99 relied upon. Copy in 321–66.

LEE T. HIX, *Primary Examiner.*

G. GOLDBERG, *Assistant Examiner.*

U.S. Cl. X.R.

328—28, 38, 39; 307—225, 260; 331—50